United States Patent
Zilliken et al.

[15] 3,676,472
[45] July 11, 1972

[54] CERTAIN LINOLEIC AND LINOLENIC ACID ESTER FRACTIONS OF VEGETABLE OILS AND DERIVATIVES THEREOF

[72] Inventors: Frederick William Zilliken, Reinagen, Rhine; Heinz Egge, Marburg, both of Germany

[73] Assignee: American Home Products Corporation, New York, N.Y.

[22] Filed: July 28, 1969

[21] Appl. No.: 845,511

[52] U.S. Cl. .....................260/410.9 R, 260/413, 424/312, 424/318
[51] Int. Cl. .....................................C07c 3/00, A61k 27/00
[58] Field of Search....................................260/410.9 R, 413

[56] References Cited

UNITED STATES PATENTS 2,383,614   8/1945   Percy..................................260/410.9

OTHER PUBLICATIONS

Riemanschneider et al., J. Am. Oil Chemists Soc. 26 371– 374 (1949)
Scholfield et al., J. Am. Oil Chemists Soc. 37 27– 29 (1960)
Chemical Abstracts 64 5350 c– e (1966)
Noller, Chemistry of Organic Compounds 3rd ed. W. B. Saunders Co. Philadelphia (1965) p. 209

*Primary Examiner*—Lewis Gotts
*Assistant Examiner*—Diana G. Rivers
*Attorney*—Edward A. Hedman and Joseph Martin Weigman

[57] ABSTRACT

This invention is concerned with prophylactically effective substances which are useful in protecting mammals against staphylococcal infection. These substances comprise the linoleic and linolenic acid ester fractions of vegetable oils and derivatives thereof. Further, it is concerned with a process for the preparation of some of these prophylactically effective substances.

4 Claims, No Drawings

CERTAIN LINOLEIC AND LINOLENIC ACID ESTER FRACTIONS OF VEGETABLE OILS AND DERIVATIVES THEREOF

This invention relates to new and novel prophylactically effective substances. In particular, it is concerned with prophylactically effective substances which when administered to mammals will protect them against staphylococcal infection. Further, it is concerned with the process for preparing some of these prophylactically effective substances from vegetable oils.

The new and novel substances of the present invention are materials that include the following: the linoleic acid ester fraction of a vegetable oil, the linolenic acid ester fraction of a vegetable oil, the alkali metal salt derivatives of the linoleic acid ester fraction of a vegetable oil, the alkali metal salt derivatives of the linolenic acid ester fraction of a vegetable oil, the free fatty acid derivatives of the linoleic acid ester fraction of a vegetable oil, the free fatty acid derivatives of the linolenic acid ester fraction of a vegetable oil, the ester derivatives of the linoleic acid ester fraction of a vegetable oil and the ester derivatives of the linolenic acid ester fraction of a vegetable oil. As employed herein the term "vegetable oil" is meant to include those fixed oils which contain a high proportion of polyunsaturated fatty acids. Typical examples of such oils are: soybean oil, sunflower oil, corn oil, cottonseed oil, peanut oil, safflower oil and linseed oil.

The new and novel process of the present invention is directed to a method of preparing the prophylactically effective linoleic and linolenic acid ester fractions of vegetable oils. These substances are obtained from vegetable oils by transesterifying the fatty acids of a vegetable oil by contact with an alkali metal hydroxide in an appropriate solvent, e.g. an alkanol, at a temperature of about 5° C. for a period of about one to about three hours.

When the transesterification of the vegetable oil fatty acids is complete, the mixture is neutralized with an acid, e.g. a mineral acid, and then extracted with an immiscible organic solvent, such as, an ether, liquid alkane, chloroform etc. Thereafter, the combined extracts are fractionally distilled under vacuum and the portion boiling between about 95°C. to about 100° C. collected. Subsequently, this collected portion is subjected to gas-liquid chromatography to separate and afford two prophylactically effective mixtures which are designated as the linoleic acid ester fraction and the linolenic acid ester fraction. These fractions are identified and collected at retention times previously determined for standard linoleic and linolenic acid methyl ester. These standard ester compounds have been found to be the major ingredients in these two fractions which contain a mixture of positional isomers. For example, upon analysis the linoleic acid ester fraction is shown to contain a mixture of about 67 percent of the 9,12-linoleic acid methyl ester; about 21 percent of 13,16-linoleic acid methyl ester; about 6 percent of 6,9-linoleic acid methyl ester and about 1.5 percent of 14,17-linoleic acid methyl ester. Preferably the above process is carried out by conducting (a) the transmethylation by contacting soybean oil or sunflower oil with potassium hydroxide in methanol, (b) the neutralization with hydrochloric acid, and (c) the extraction with petroleum ether.

The new and novel prophylactically effective derivatives of the present invention, such as, the alkali metal salts, the free fatty acids and the esters of the above-described linoleic and linolenic acid ester fractions may be prepared by standard procedures well known to those skilled in the chemical art. In this regard, the new and novel prophylactically effective free fatty acid derivatives of the linoleic and linolenic acid ester fractions may be prepared by first contacting one of these acid ester fractions with an alkanolic alkali metal hydroxide solution, e.g. sodium hydroxide in methanol. Thereafter, the resulting mixture is acidified with a mineral acid, e.g. hydrochloric acid, extracted with a water-immiscible organic solvent, e.g. petroleum ether, the separated extract washed with water, dried and evaporated to dryness to afford the appropriate free fatty acid derivatives.

The new and novel prophylactically effective alkali metal salt derivatives of the linoleic and linolenic acid ester fractions may be prepared by admixing an alkanolic solution, e.g. methanol of the above-prepared free fatty acid derivatives with an excess of an aqueous alkali metal hydroxide. When the salt formation is complete, the solvent is removed by evaporation to afford the appropriate alkali metal salt derivatives.

Alternatively, the alkali metal salt derivatives may be prepared by contacting an ether solution, e.g. petroleum ether of the free fatty acid derivatives of either the linoleic or linolenic acid ester fractions with an aqueous solution of an alkali metal hydroxide. Thereafter, the water layer is separated and evaporated to dryness to afford the corresponding alkali metal salt derivatives.

The new and novel prophylactically effective ester derivatives of the linoleic and linolenic acid ester fractions may be prepared by refluxing the free fatty acid derivatives of either the linoleic or linolenic acid ester fractions with an alkanol in the presence of trace amounts of a mineral acid. When the esterification is complete, the solvent is removed by evaporation to afford the appropriate ester derivatives. The ester obtained in this manner correspond to the alkanol employed in the reaction. For example, if butanol is used as the reactant, the product will be the corresponding butylester derivatives.

The new and novel prophylactically effective substances of the present invention which include the linoleic acid ester fraction of a vegetable oil, the linolenic acid ester fraction of a vegetable oil, the alkali metal salt derivatives of the linoleic acid ester fraction of a vegetable oil, the alkali metal salt derivatives of the linolenic acid ester fraction of a vegetable oil, the free fatty acid derivatives of the linoleic acid ester fraction of a vegetable oil, the free fatty acid derivatives of the linolenic acid ester fraction of a vegetable oil, the ester derivatives of the linoleic acid ester fraction of a vegetable oil and the ester derivatives of the linolenic acid ester fraction of a vegetable oil possess valuable biological activity. In particular, these substances when tested by the procedure set forth below and essentially described by P. Gyorgy, S. Dhanamitta and E. Steers, Science 137, 338 (1962) demonstrate protective effects in mammals against infectious doses of *Staphylococcus aureus*. For this reason, these substances are useful when administered to mammals as protective agents against staphylococcal infections.

In the biological evaluation of the prophylactically effective substances of this invention the in vivo effects are tested as follows:

Swiss albino mice, Swiss Webster —HFT (SW) and Swiss albino mice NMR—4, all male weighing 25–25 g. are used. The animals have free access to chow and water.

About 100 to about 300 micrograms of one of a prophylactically effective substances of this invention is admixed with every hundredth part of an $LD_{100}$ of a virulent strain of *Staphylococcus aureus* employed. Preferably a 1/100 saline dilution of the $LD_{100}$ of a virulent strain of said organism is employed for this purpose. The strain of *Staphylococcus aureus* used is coagulase positive, phage type 44 A. Inoccula are prepared according to the method of Higgenbotham et al, Proc. Soc. Exptl. Biol. Med. 20, 253 (1955). The cells are harvested during the log phase of the culture at turbidity 60 measured at 660 n m as described by J. R. Merkel and E. Steers, J. Bacteriol. 66, 389 (1953). The $LD_{100}$ inoculum is 0.3 ml. of a 75 percent dilution (with an 0.85 percent saline) of a 25 percent of Fritdrie strain of *Staphylococcus aureus* which is 10.67 × 10⁶ cocci cells/mouse.

The mice in groups of 10 are given consecutive daily subcutaneous injections of an above-prepared mixture at either the same or different sites for a period of about five to about seven days. All mice are then challenged by intraperitoneal injection on either the first, seventh or fourteenth day after completion of the subcutaneous injection schedule with a lethal dose ($LD_{100}$) of a virulent strain staphylococci. Death rates are determined 48 hours after challenge.

When the prophylactically effective substances of the present invention are administered by the above-procedure at a dosage range of about 5 to about 25 mg./kilo of body weight, they protected the test animals against an infectious staphylococcal challenge.

When the prophylactically effective substances of this invention are employed to protect mammals, e.g. mice, rats, rabbits, cats, dogs, etc. against staphylococcal infection, they may be administered alone or in combination with pharmacologically acceptable carriers, the proportion of which is determined by the solubility and chemical nature of the material, chosen route of administration and standard biological practice. For example, they may be administered orally in the form of tablets or capsules containing such excipients as starch, milk sugar, certain types of clay and so forth. They may also be administered orally in the form of solutions or they may be injected parenterally. For parenteral administration they may be used in the form of a sterile solution or suspension containing other solutes, for example, enough saline or glucose to make the solution isotonic. These substances may also be administered by simple admixture with foods, e.g. prepackaged formulations and compositions.

The dosage of the prophylactically effective substances of this invention will vary with the form of administration and the particular substance chosen. Furthermore, it will vary with the particular subject under treatment. In general, the substances of this invention are most desirably administered at a concentration level that will generally afford effective results without causing any harmful or deleterious side effects.

The following examples are given by way of illustration:

EXAMPLE I

One gram of soybean oil is admixed with 100 ml. of 0.1 N potassium hydroxide in absolute methanol and held at 4° C. for one hour. The reaction mixture is then neutralized with 1 N hydrochloric acid and extracted three times with 50 ml of petroleum ether (b.p. 40°–61° C.). The combined petroleum ether extract is washed twice with 10 ml of water and then dried by the addition of anhydrous sodium sulfate. The solution is filtered and the petroleum ether removed under vacuum. The residue of fatty acids methyl esters is then fractionated by high vacuum distillation at $10^{-3}$ Torr and the portion distilling between 95° C. to about 100° C. is collected. This 95°–100° C. distillate is then fractionated by preparative gas-liquid chromatography to collect the linoleic acid methyl ester fraction and the linolenic acid methyl ester fraction. These fractions are identified and collected at the retention times previously determined for standard linoleic and linolenic acid methyl esters.

In the same manner, the linoleic acid methyl ester fraction and the linolenic acid methyl ester fraction of sunflower oil are obtained.

EXAMPLE II

Four grams of safflower oil is admixed with 400 ml of 0.1 N sodium hydroxide in absolute ethanol and held at 5° C. for 3 hours. The reaction mixture is then neutralized with 1 N sulfuric acid and extracted three times with 200 ml of hexane. The combined hexane extract is washed twice with 40 ml of water, dried by the addition of anhydrous sodium sulfate, and filtered. The filtrate is then fractionated by high vacuum distillation at $10^{-3}$ Torr and the portion distilling at 95° C. to about 100° C. collected. This distillate is then fractionated by preparative gas-liquid chromatography to collect the linoleic acid ethyl ester fraction and the linolenic acid ethyl ester fraction. These fractions are identified and collected at the retention times previously determined for standard linoleic and linolenic acid methyl esters.

In the same way, the linoleic and linolenic acid ester fractions of corn oil, cottonseed oil, peanut oil, and linseed oil are prepared.

EXAMPLE III

The linoleic acid methyl ester fraction (0.1 gm) of soybean oil, as prepared in Example I, is admixed with 50 ml of methanolic 0.1 N sodium hydroxide for twenty minutes at 50° to 70° C. Thereafter, the reaction mixture is added to 25 ml. of water, acidified with hydrochloric acid and extracted with three successive portions of petroleum ether. The combined petroleum ether extract is washed with water, dried with sodium sulfate and evaporated under vacuum to afford the free fatty acid derivatives of the linoleic acid methyl ester fraction of soybean oil.

In like manner, the free fatty acid derivatives of the following linoleic and linolenic acid ester fractions are prepared: the linolenic acid methyl ester fraction of soybean oil; the linoleic acid methyl ester fraction of sunflower oil, the linolenic acid methyl ester fraction of sunflower oil, the linoleic acid ethyl ester fraction of safflower oil and the linolenic acid ethyl ester fraction of safflower oil.

EXAMPLE IV

Repeating the procedure of Example III, the linoleic and linolenic acid ester fractions of corn oil, cottonseed oil, peanut oil and linseed oil, as prepared in Example II, are converted to their corresponding free fatty acid derivatives.

EXAMPLE V

The free fatty acid derivatives of the linoleic acid methyl ester fraction of soybean oil (0.1 gm.), as prepared in Example III, in 50 ml of methanol is neutralized with an aqueous solution of 0.1 N sodium hydroxide. Thereafter, the solvent is removed under vacuum to afford the sodium salt derivatives of the linoleic acid methyl ester fraction of soybean oil.

Similarly, the sodium salt derivatives of the linoleic acid methyl ester fraction of soybean oil, the potassium salt derivatives of the linoleic acid methyl ester fraction of sunflower oil, and the sodium salt derivatives of the linolenic acid methyl ester fraction of sunflower oil are produced.

EXAMPLE VI

The free fatty acid derivatives of the linoleic acid ethyl ester fraction of safflower oil (0.2 gm.), as prepared in Example III, in 100 ml of petroleum ether is extracted with 100 ml of an aqueous 0.1 N sodium hydroxide solution. Thereafter, the aqueous layer is separated and evaporated to dryness to yield the sodium salt derivatives of the linoleic acid ethyl ester fraction of safflower oil.

When the above procedure is repeated to react the free fatty acid derivatives of the linolenic acid ethyl ester fraction of safflower oil with potassium hydroxide, the corresponding potassium salt derivatives are obtained.

Similarly, the free fatty acid derivatives of the linoleic and linolenic acid ester fractions of corn oil, cottonseed oil, peanut oil and linseed oil are reacted with an alkali metal hydroxide to afford the corresponding alkali metal salt derivatives.

EXAMPLE VII

The free fatty acid derivatives of the linoleic acid methyl ester fraction of soybean oil (0.5 gm.), as prepared in Example III, in 200 ml of propanol containing two percent sulfuric acid is refluxed for one-half hour. Thereafter, the solvent is removed under vacuum to afford the corresponding propyl ester derivatives of the linoleic acid methyl ester fraction of soybean oil.

In like manner, the pentyl ester derivatives of the linolenic acid methyl ester fraction of soybean oil, the ethyl derivatives of the linoleic acid methyl ester fraction of sunflower oil, and the hexyl derivatives of the linolenic acid methyl ester fraction of sunflower oil are obtained.

EXAMPLE VIII

When the procedure of Example VII is repeated to esterify the free fatty acid derivatives of the linoleic and linolenic acid ester fractions of safflower oil with butanol, the corresponding butyl ester derivatives are obtained.

Similarly, other ester derivatives of the free fatty acid derivatives of the linoleic and linolenic acid ester fractions of corn oil, cottonseed oil, peanut oil and linseed oil are prepared by reaction with appropriate alcohols.

What is claimed is:

1. A product selected from the group consisting of the linoleic acid ester fraction of a vegetable oil and the linolenic acid ester fraction of a vegetable oil and mixtures thereof, each of said fractions being obtained by
   a. transesterification of fatty acids of the selected vegetable oil by contact with an alkali metal hydroxide in an alkanol at a temperature of about 5°C. for a period of about 1 to about 3 hours;
   b. neutralization of the transesterified mixture with an acid and the subsequent extraction thereof with an immiscible organic solvent;
   c. fractional, vacuum distillation of said immiscible organic extract to collect the portion which boils between about 95°C. and about 100°C. at $10^{-3}$ Torr; said portion being a mixture of said linoleic acid ester fraction and said linolenic acid ester fraction; and, if desired separating said linoleic acid ester fraction from said linolenic acid ester fraction by gas-liquid chromatographic separation.

2. A product as described in claim 1 wherein said linoleic acid ester fraction is the linoleic acid methyl ester fraction and wherein said linolenic acid ester fraction is linolenic acid methyl ester fraction.

3. A product according to claim 2 wherein said vegetable oil is selected from the class consisting of soybean oil and sunflower oil.

4. A product selected from the class consisting of an alkali metal salt of the linoleic acid ester fraction of claim 2, and alkali metal salt of the linolenic acid fraction of claim 2, the free fatty acid of the linoleic acid ester of fraction claim 2, the free fatty acid of the linolenic acid ester fraction of claim 2, the $C_2$ through $C_6$ alkyl ester of the linoleic acid ester fraction of claim 2 and the $C_2$ through $C_6$ alkyl ester of the linolenic acid ester fraction of claim 2.

* * * * *